United States Patent
Burg (10) Patent No.: US 7,422,498 B2
(45) Date of Patent: Sep. 9, 2008

(54) SHIP WITH WAVE ENGULFING ENHANCED PROPULSORS

(76) Inventor: Donald E. Burg, 15840 SW. 84th Ave., Miami, FL (US) 33157

(*) Notice: Subject to any disclaimer, the term of this patent is extended or adjusted under 35 U.S.C. 154(b) by 98 days.

(21) Appl. No.: 11/373,620

(22) Filed: Mar. 10, 2006

(65) Prior Publication Data

US 2006/0217009 A1 Sep. 28, 2006

Related U.S. Application Data

(63) Continuation-in-part of application No. 11/088,212, filed on Mar. 18, 2005, now abandoned, and a continuation-in-part of application No. 11/109,132, filed on Mar. 31, 2005.

(51) Int. Cl.
*B63H 11/00* (2006.01)
(52) U.S. Cl. .......................... 440/38; 440/47
(58) Field of Classification Search ............ 440/38, 440/47
See application file for complete search history.

(56) References Cited

U.S. PATENT DOCUMENTS

| 36,526 | A | * | 9/1862 | Harris | 440/38 |
| 39,394 | A | * | 8/1863 | Plumb | 440/38 |
| 3,155,065 | A | * | 11/1964 | Strumskis | 114/122 |
| 3,342,032 | A | * | 9/1967 | Cox et al. | 60/221 |
| 3,499,412 | A | * | 3/1970 | Anthes et al. | 440/67 |
| 4,192,461 | A | * | 3/1980 | Arborg | 239/265.17 |
| 5,505,639 | A | * | 4/1996 | Burg | 440/42 |
| 6,554,660 | B2 | * | 4/2003 | Irish | 440/38 |

* cited by examiner

*Primary Examiner*—Ed Swinehart (57) ABSTRACT

Presented is a way to reduce the wave drag of high speed ships by ingesting wave energy into water propulsors disposed at the bow and/or on the sides of the main hull of the ship. A forward secondary bow disposed at a lower portion of the main bow of the ship is an optimum location to have bow water propulsor water inlets. Performance of the water propulsors can be enhanced by using Coanda effect water energizers at the inlets to the water propulsors. Water propulsor discharge is preferably into an air layer on the underside of the ship's main hull.

20 Claims, 4 Drawing Sheets

SHIP WITH WAVE ENGULFING ENHANCED PROPULSORS

RELATED UNITED STATES DATA

This application is a continuation-in-part of, Ser. No. 11/088,212 filed Mar. 18, 2005 now abandoned, and Ser. No. 11/109,132 filed Mar. 31, 2005.

BACKGROUND OF THE INVENTION

The total resistance of displacement hull ships is composed primarily of frictional resistance at low speed/length ratios. As the speed and hence the speed/length ratio of these ships is increased the resistance increased dramatically. This dramatic increase in resistance is due mainly to the wave drag increase. For example the friction drag of a 400 foot (122 meter) LWL (Length Water Line) ship running at 15 knots makes up over 80 percent of total ship resistance. When that same ship is run at 45 knots this reverses and the wave drag makes up over 80 percent of total resistance. It is obvious that what needs to be able to run displacement hulls at high speeds efficiently is to reduce wave drag.

Applicant has addressed this in some of his earlier filed applications wherein water for large waterjet propulsors is taken into propulsor water inlets located on the surface of bulbous bows with said water inlets disposed aft of the inward curving surface of the bulbous bows. The discharge water from the very large water propulsors used is, preferably, discharged into an air layer located on the underside of the ship's main hull. The effect of discharging the propulsor water into a pressurized air layer has several benefits. First, the discharge water jet is more efficient since there are no turbulent mixing losses related to the discharge water mixing with water flowing adjacent to the hull. Second, the air layer reduces frictional resistance of the hull. Third, it is possible to have a steering and/or reversing system installed on the discharge of the propulsor that is internal to the air layer and hence add no drag when moving forward at high speeds.

The instant invention carries that approach further and enhances the efficiency of the water inlets and therefore of the water propulsors themselves. This then also increases the related wave absorbing ability of the propulsors which reduces wave drag of the ship. This is accomplished in the first embodiment of the invention by having propulsor ram water inlet(s) disposed at the forward end of a secondary lower bow on the ship along with, optionally, water propulsor inlets at a forward knuckle and proximal the aft sides of the ship to maximize wave energy absorption. All propulsor water inlets are preferably supplied with Coanda effect fluid energy enhancers to further improve the efficiency of pressure recovery by the water propulsor inlets. Applicant has described such Coanda effect elements in an earlier application related to waterjet propulsors and they are also described in some detail in this application.

The instant invention offers advancements over applicant's earlier applications as well as over the prior art. These advancements are discussed in some detail in the following sections.

SUMMARY OF THE INVENTION

A primary object of the invention is to translate energy in water taken in by water propulsors into a subtractive energy from the wave energy normally created by a ship.

A related object of the invention is to have a secondary bow disposed, at least in its majority, proximal a lower forward portion of a main bow of the ship wherein water propulsor inlets located in or proximal to said secondary bow take in the water flowing around the secondary bow.

A further related object of the invention is that the secondary bow be wider in dimension than high.

Yet another object of the invention is that there be a bow oriented water propulsor having a first bow oriented ram water inlet disposed proximal a forward portion of the secondary bow of the main hull of the ship wherein said bow oriented ram water inlet, at least in its majority, defines an opening in a forward portion of the secondary bow of the ship and takes in water directly approaching the secondary bow of the ship.

A directly related object of the invention is that, when the ship is moving forward and the first bow oriented water propulsor is operating and producing forward thrust, water taken into the first bow oriented ram water inlet generates a hydrodynamic force on a bow wave of said ship thereby reducing energy of said bow wave.

Another related object of the invention is that said bow oriented water propulsor expel at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

A further object of the invention is that the first bow oriented water propulsor further comprises a steering means wherein said steering means is, at least in its majority and with the ship moving forward and with the first bow oriented water propulsor producing forward thrust, disposed internal to the first open bottomed pressurized gas layer.

A further and related object of the invention is that the first bow oriented water propulsor further comprises a thrust reversing means wherein said thrust reversing means is, at least in its majority and with the ship moving forward and with the first bow oriented water propulsor producing forward thrust, disposed internal to the first open bottomed pressurized gas layer.

Still another object of the invention is it further include outrigger hulls disposed either side of the main hull of the ship.

Yet another object of the invention is that it further comprise a propulsor water inlet disposed aft of the secondary bow and in a side of the main hull of the ship proximal a forward knuckle in the main hull of the ship wherein said water inlet is supplied with water energized by a Coanda effect fluid energizing device disposed proximal the propulsor water inlet.

Still another object of the invention is that it further comprise a propulsor water inlet disposed in the side of, forward of, and proximal an aft portion of the main hull of the ship wherein said water inlet is supplied with water energized by a Coanda effect fluid energizing device disposed proximal the propulsor water inlet.

In an improved means for integrating a water propulsion system into a ship, the improvement comprising:

Another object of the invention is that it may include a secondary bow upper surface propulsor water inlet and wherein said secondary bow upper surface propulsor water inlet takes in water flowing over the secondary bow of the ship and supplies said water to a water propulsor and wherein, when the ship is moving forward and the water propulsor is operating and producing forward thrust, water taken into the secondary bow upper surface propulsor water inlet generates a hydrodynamic force on a bow wave of said ship thereby reducing energy of said bow wave.

A directly related object of the invention is that said bow oriented water propulsor that receives its inlet water from a water inlet disposed on an upper surface of the secondary bow then expels at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

A further related object of the invention is that it include an inlet fluid flow controlling flap disposed internal to the secondary bow upper surface propulsor water inlet A further object of the invention is that it further comprise a secondary bow lower surface propulsor water inlet and wherein said secondary bow lower surface propulsor water inlet takes in water flowing under the secondary bow of the ship and supplies such water to a water propulsor and wherein, when the ship is moving forward and the water propulsor is operating and producing forward thrust, water taken into the secondary bow lower surface propulsor water inlet generates a hydrodynamic force on a bow wave of said ship thereby reducing energy of said bow wave.

A related object of the invention is that it further include an inlet fluid flow controlling flap disposed internal to the secondary bow lower surface propulsor water inlet.

Yet another object of the invention is that said secondary bow of the main hull of the ship include a Coanda effect fluid energizer disposed proximal a forward portion of said secondary bow wherein said Coanda effect fluid energizer energizes water supplied to a propulsor water inlet and wherein said water inlet supplies water to a water propulsor and wherein, when the ship is moving forward and the water propulsor is operating and generating forward thrust, water taken into the propulsor water inlet generates a hydrodynamic force on a bow wave of said ship thereby reducing energy of said bow wave.

A directly related object of the invention is that said bow oriented water propulsor expel at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

Another object of the invention is that it include a secondary bow upper surface propulsor water inlet and a Coanda effect fluid energizing means disposed forward of said secondary bow upper surface propulsor water inlet to thereby energize water taken into the secondary bow upper surface propulsor water inlet and wherein said secondary bow upper surface propulsor water inlet takes in water flowing over the secondary bow of the ship and supplies such water to a water propulsor and wherein, when the ship is moving forward and the water propulsor is operating and producing forward thrust, water taken into the secondary bow upper surface propulsor water inlet generates a hydrodynamic force on a bow wave of said ship thereby reducing energy of said bow wave.

Still another object of the invention is that it further include a secondary bow lower surface propulsor water inlet and a Coanda effect fluid energizing device disposed forward of said secondary bow lower surface propulsor water inlet to thereby energize water taken into the lower surface propulsor water inlet and wherein said secondary bow lower surface propulsor water inlet takes in water flowing under the secondary bow of the ship and supplies such water to a water propulsor and wherein, when the ship is moving forward and the water propulsor is operating and producing forward thrust, water taken into the secondary bow lower surface propulsor water inlet generates a hydrodynamic force on a bow wave of said ship thereby reducing energy of said bow wave.

BRIEF DESCRIPTION OF THE DRAWINGS

FIG. 4 gives a forward partial isometric underside view showing, by way of use of transparent hull plating, typical machinery locations. Note the propulsor water inlets at the preferred hammerhead shaped secondary bow that feed water to the water propulsors and the water inlets on the sides of the hull at a forward knuckle in the hull that feed water propulsors. These propulsors, in the preferred embodiment of the invention, engulf wave energy generated by the ship thereby reducing wave drag which is a paramount object of the instant invention. Both sets of propulsors, in the preferred embodiment of the invention, discharge into an air layer under the main hull here.

FIG. 5 presents an aft partial isometric underside view showing, by way of use of transparent hull plating, water inlets feeding aft propulsors.

FIG. 6 gives a cross-section, as taken through plane 6-6 of FIG. 4, that shows the preferred embodiment of internal workings of the forward secondary bow.

FIG. 7 is a partial cross-section, as taken through plane 7-7 of FIG. 4, that illustrates workings of a water inlet for a propulsor. In this instance there is a Coanda effect element that induces water flowing alongside the hull to turn inward into the propulsor inlet.

FIG. 8 presents a partial cross-section, as taken through plane 8-8 of FIG. 5, that illustrates workings of a water inlet for a aft propulsor. In this instance there is a Coanda effect element that induces water flowing alongside the hull to turn inward into the propulsor inlet. Note that, as is also the case for the forward inlet described in FIG. 7, the Coanda effect element may: 1) be fixed and not rotate, 2) rotate freely without drive means, or 3) Rotate by means of powered drive means.

DETAILED DESCRIPTION

Figure 1:
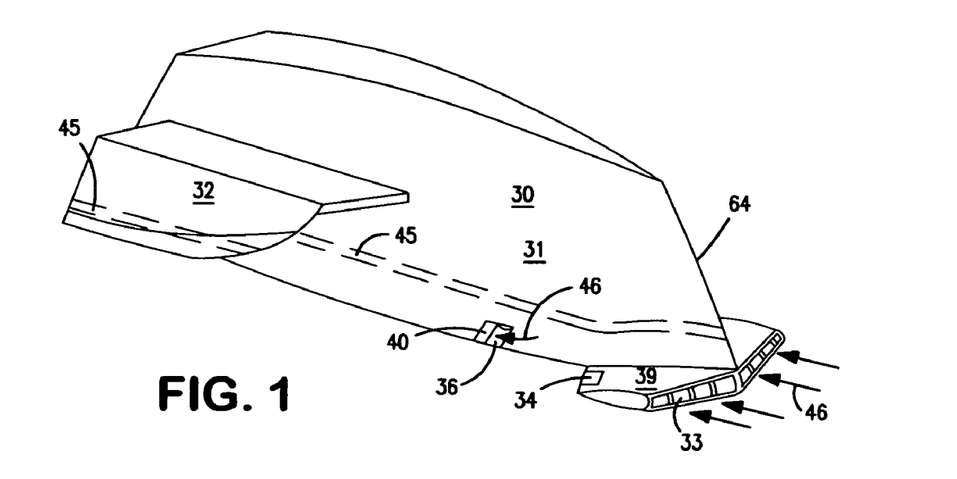
FIG. 1 presents an isometric forward quarter topside view of a ship hull to the instant invention.

FIG. 1 presents an isometric forward quarter topside view of an instant invention ship 30, ship main hull 31, main hull bow 64, and optional outrigger hulls 32. Shown also are a secondary bow 39 that takes in propulsor water, indicated by water flow lines 46, into a ram inlet 33 at its forward end and that also has trim control flaps 34. The secondary bow 39 shown here has a preferred hammerhead shape although other shapes can be utilized within the spirit and scope of the invention. Other items shown are waterlines 45 and a propulsor main hull forward water inlet 40 disposed proximal a forward knuckle in the main hull 31. The propulsor main hull forward water inlet 40 has a generally cylindrical shaped Coanda effect inlet water energizer 36 disposed proximal its forward end. The Coanda effect is well known and describes the tendency of fluids to follow curved surfaces. This Coanda effect directs and energizes water approaching the propulsor water inlet 40 thereby improving the efficiency of the propulsor being supplied with water.

Figure 2:
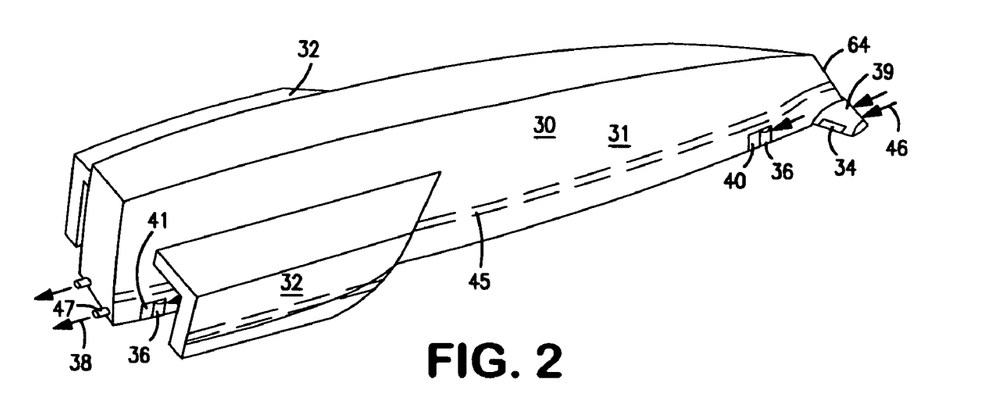
FIG. 2 shows an isometric aft quarter topside view of a ship hull to the instant invention.

FIG. 2 shows an isometric aft quarter topside view of the ship hull 30 presented in FIG. 1. Other items shown here are discharge portions of water propulsors 47, water propulsor thrust vectors 38, aft water propulsor water inlet 41, and aft water propulsor water inlet Coanda energizer 36.

Figure 3:
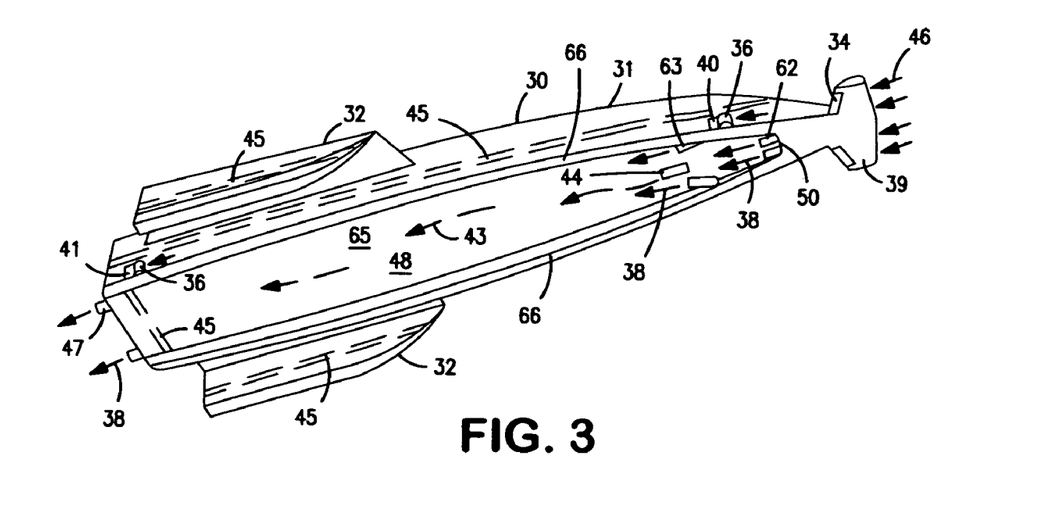
FIG. 3 presents an isometric aft quarter underside view of a ship hull to the instant invention.

FIG. 3 presents an isometric aft quarter underside view of a ship 30 to the instant invention. Additional items shown here include an air layer recess 65 inset into the main hull 31, air layer 48, sidekeels 66, pressurized air discharge duct opening 44, air flow arrows 43, hull step inset 50 that a forward part of the air layered recess 48, and forward water propulsors 62 that would, in the preferred embodiment of the invention, be water accelerating waterjets 62. Forward side feeding water propulsors 63 are also shown.

Figures 4, 5, 6, 7, 8:
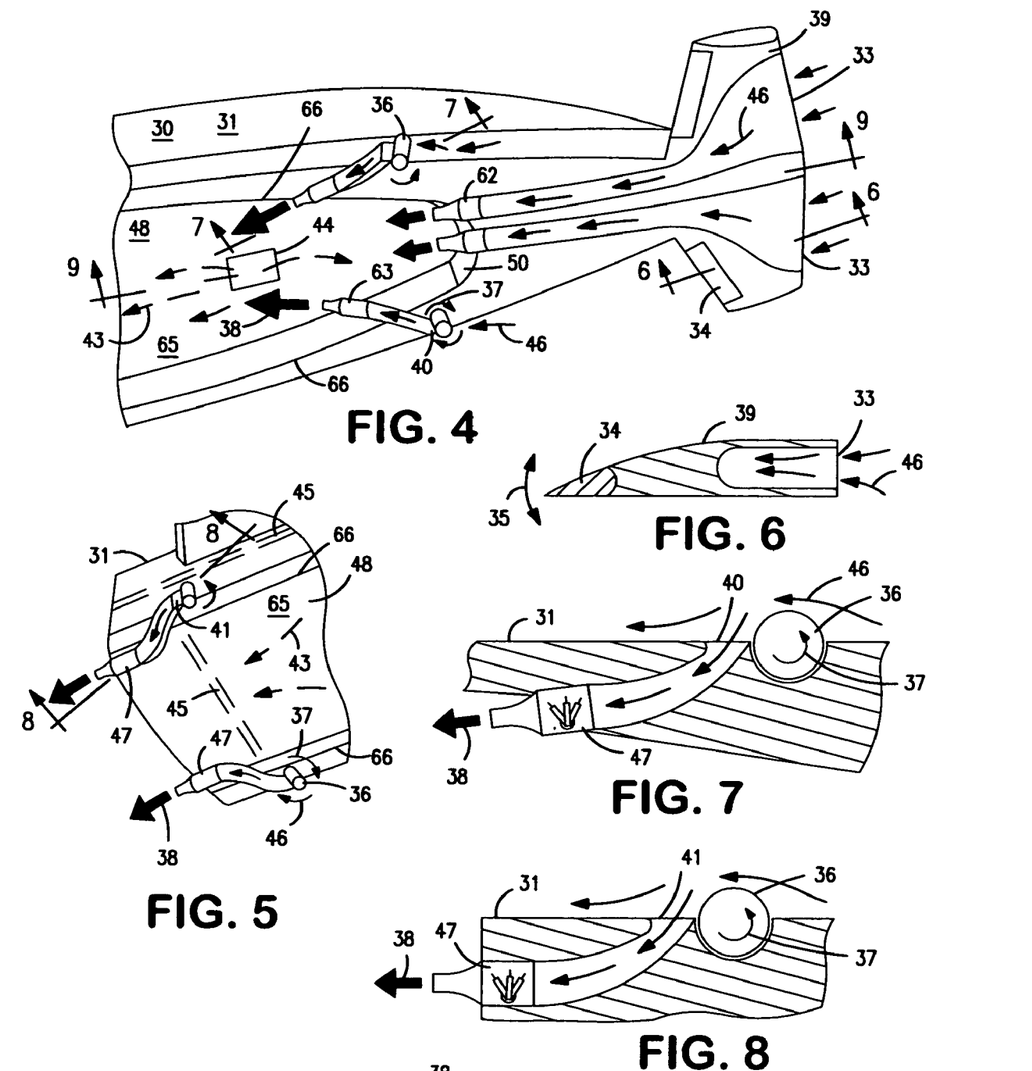

FIG. 4 gives a forward partial isometric underside view of the main hull 31 showing, by way of use of transparent hull plating, typical forward waterjet propulsor 62 locations, secondary bow ram inlets 33 that feed the propulsor water into the, preferably hammerhead shaped, secondary bow 39 that in turn feed water to the forward water propulsors 62. The forward water inlets 40 on the sides of the hull 31 located proximal a knuckle in the hull feed forward side feed water propulsors 63. Note that a knuckle in the hull is where the sides of the hull, after diverging going aft from the bow, becomes more parallel going aft. These propulsors either individually or in part engulf wave energy generated by the ship 30 thereby reducing wave drag which is a paramount object of the instant invention. Both sets of propulsors 62 and 63, in the preferred embodiment of the invention, discharge into a recess enclosed air layer 48 under the main hull 31 here.

FIG. 5 presents an aft partial isometric underside view showing, by way of use of transparent hull plating, water inlets 41 feeding aft propulsors 47. Note the waterline 45 on the main hull 31 which indicates where the pressurized air layer 48 terminates going aft.

FIG. 6 gives a cross-section, as taken through plane 6-6 of FIG. 4, that shows the preferred embodiment of internal workings of the forward secondary bow 39. A rotation arrow 35 indicates rotational capabilities of the trim flap 34.

FIG. 7 is a partial cross-section, as taken through plane 7-7 of FIG. 4, that illustrates workings of a water inlet 40 for a water propulsor 63. In this instance there is a Coanda effect element 36 that induces water flowing alongside the hull to turn inward into the propulsor inlet. A Coanda effect rotation arrow 37 is indicated here. A preferred embodiment water propulsor in the form of an electrically driven waterjet 63 is shown here. Note that such an electrically driven waterjet 63 would normally have, although not shown here, an impeller rim mounted armature that is driven by a stator wound field housing. Further it is expected that water propulsor steering and, or reversing mechanisms, although not shown, would be installed on the discharges of the water propulsors. These steering and/or reversing mechanisms would be designed to not contact water passing under the hull during forward high speed operation of the hull.

FIG. 8 presents a partial cross-section, as taken through plane 8-8 of FIG. 5, that illustrates workings of a water inlet 41 for an aft propulsor 47. In this instance there is a Coanda effect element 36 that induces water flowing alongside the hull to turn inward into the propulsor inlet 40.

Figure 9:
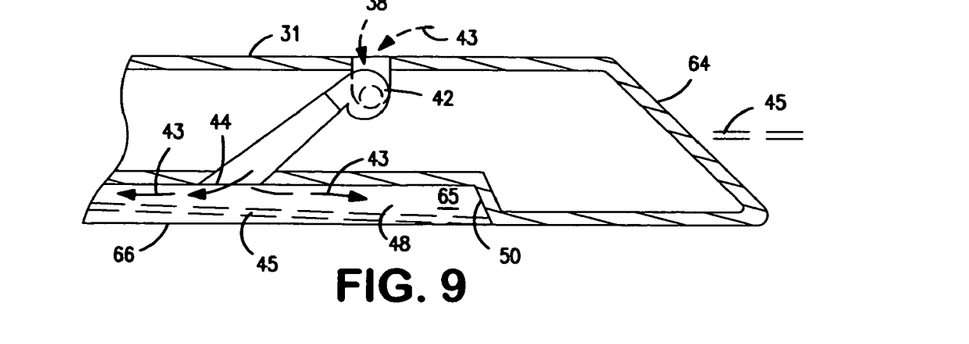
FIG. 9 illustrates, by way of a partial cross-section taken through plane 9-9 of FIG. 4, a centerline plane of a main hull of the instant invention ship. Note the powered blower maintained air layer under the hull that is defined by a step in the hull at its forward end in this preferred embodiment.

FIG. 9 illustrates, by way of a partial cross-section taken through plane 9-9 of FIG. 4, a centerline plane of a main hull 31 of the instant invention ship 30. Note the powered blower 42 maintained recessed air layer 48 under the main hull 31 that is defined by an inset hull step 50 at its forward end. Note also that the recess air layer 48, in the preferred embodiment of the instant invention, rises going from forward to aft.

Figure 10:
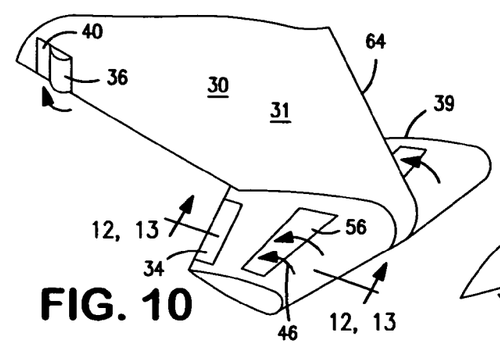
FIG. 10 presents an alternative way to locate propulsor water inlets. In this case the propulsor water inlets are located on an upper surface of the secondary bow.

FIG. 10 presents an alternative way to locate propulsor upper water inlets 56 in the secondary bow 39. In this case the upper propulsor water inlets 56 are located on an upper surface of the secondary bow 39 which provides good location for aspiration of wave energy generated by the inventive ship's main bow 64 and secondary bow 39.

Figure 11:
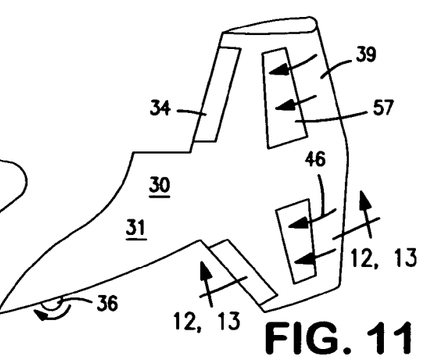
FIG. 11 shows an underside of a secondary bow where the propulsor water inlets are positioned thereon.

FIG. 11 shows an underside of a secondary bow 39 where lower propulsor water inlets 57 are positioned.

Figure 12:
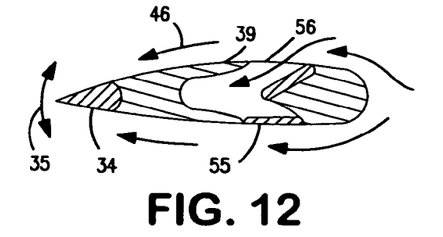
FIG. 12 shows a cross-section of the secondary bow, as taken through plane 12-12 of FIG. 10, that shows propulsor inlet water being taken in on the upper surface of the secondary bow. Note the propulsor inlet water flow control flaps that are open on the upper surface and closed on the lower surface here. It is to be also noted that water inlets may be positioned either on the upper and bottom surfaces of the secondary bow or on both surfaces.

FIG. 12 shows a cross-section of the secondary bow 39, as taken through plane 12-12 of FIG. 10, that shows propulsor inlet water being taken in on the upper surface of the secondary bow 39 through upper water inlet 56. Note the propulsor inlet water flow control flaps 55 that are open on the upper surface and closed on the lower surface here. It is to be also noted that water inlets may be positioned either on the upper and bottom surfaces of the secondary bow or on both upper and lower surfaces.

Figure 13:
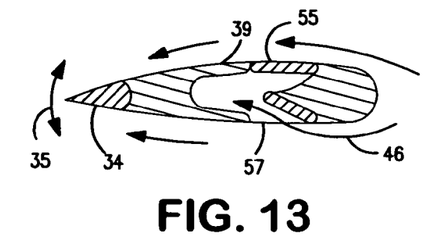
FIG. 13 presents a secondary bow cross section wherein, in this instance, the propulsor inlet water flow is taken in on the lower surface of the secondary bow.

FIG. 13 presents a secondary bow cross-section wherein, in this instance, the propulsor inlet water flow is taken in on the lower surface of the secondary bow 39 through lower propulsor water inlet 57.

Figures 14, 15:
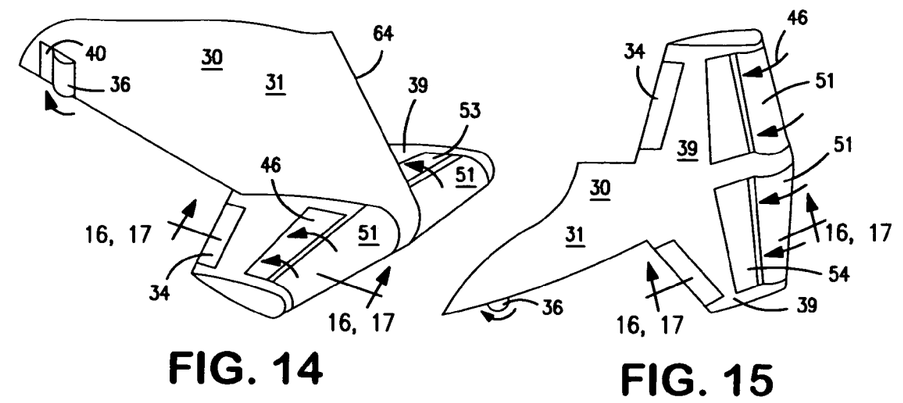
FIG. 14 is a partial topside isometric bow view of a secondary that shows what is probably the most efficient way to take in propulsor water which is done by energizing the inlet water flow using a Coanda effect inducer. In this instance the propulsor water inlet is being taken in through an upper surface opening in the secondary bow. The Coanda effect inducer here may be: 1) fixed and non-rotating, 2) free wheeling, or 3) driven by a powered actuator as was the case for those presented in FIGS. 7 and 8.
FIG. 15 shows a secondary bow in a bottom isometric bow view where a Coanda effect flow inducer is used to energize on-coming water and directing that water into a secondary bow bottom surface propulsor water inlet.

FIG. 14 is a partial topside isometric bow view of a secondary bow 39 that shows what is probably the most efficient way to take in propulsor water which is done by energizing the inlet water flow using a forward mounted Coanda effect inducer 51. In this instance the propulsor water is being taken in through an upper surface opening 53 in the secondary bow 39. As mentioned previously, the Coanda effect fluid inducer 51 may be: 1) fixed and non-rotating, 2) free wheeling, or 3) driven by a powered actuator.

FIG. 15 shows a secondary bow 39 in a bottom isometric bow view where a Coanda effect flow inducer 51 is used to energize on-coming water and directing that water into a secondary bow bottom surface propulsor water inlet 54. There are instances in the design wherein it is preferable to take in propulsor water on the upper surface and other instances, particularly when encountering very rough seas, where it is preferable to take in propulsor water on the lower surface of the secondary bow 39.

Figure 16:
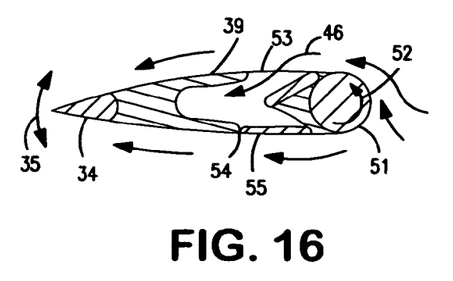
FIG. 16 is a cross-section, as taken though plane 16-16 of FIG. 14, that shows a Coanda effect water inducer directing in-coming water to a water inlet on an upper surface of the secondary bow.

FIG. 16 is a cross-section, as taken though plane 16-16 of FIG. 14, that shows a Coanda effect water inducer 51 directing in-coming water to a water inlet 53 on an upper surface of the secondary bow 39. Note that the water flow control flaps 55 are open for water coming into the upper inlet 53 and closed on the bottom inlet 54 in this illustration. Note that flow can come into both inlets at the same time which would be preferable in most running conditions.

Figure 17:
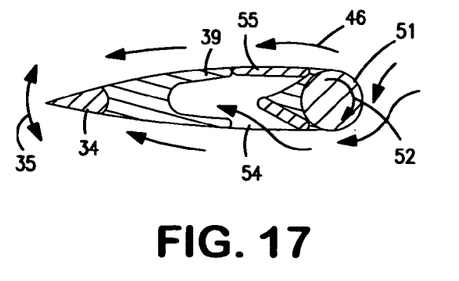
FIG. 17 presents a cross-section, taken through plane 17-17 of FIG. 15, that shows a forward disposed Coanda effect inducer directing water toward a propulsor water inlet disposed in a lower surface of the secondary bow.

FIG. 17 presents a cross-section, taken through plane 17-17 of FIG. 15, that shows a forward disposed Coanda effect inducer 51 directing water toward a propulsor water inlet 54 disposed in a lower surface of the secondary bow 39.

Figure 18:
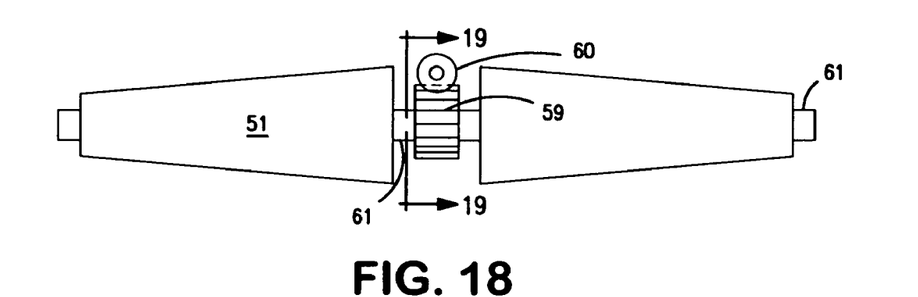
FIG. 18 shows what a preferred embodiment of a tapered Coanda effect water energizer as could be used in FIGS. 14-17. In this instance there is a drive gear in the center of the Coanda effect water energizer. Other means of driving a Coanda effect water energizer may be used. The Coanda effect water energizer may be driven by powering means as illustrated in FIGS. 18 and 19.

FIG. 18 shows what a preferred embodiment of a tapered Coanda effect water energizer 51 as could be used in FIGS. 14-17. In this instance there is a drive gear system 59 and 60 in the center of the Coanda effect water energizer 51. Other means of driving a Coanda effect water energizer may be used.

Figure 19:
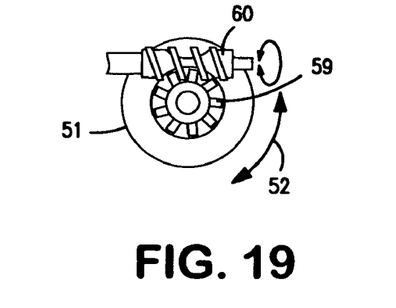
FIG. 19 presents a cross section, as taken through plane 19-19 of FIG. 18, that shows drive gear means for the tapered Coanda element of FIG. 18.

FIG. 19 presents a cross section, as taken through plane 19-19 of FIG. 18, that shows drive gear means 59 and 60 for the tapered Coanda element 51 of FIG. 18. A rotational arrow 52 shows that the Coanda element 51 may rotate in either direction dependent upon which is preferred for a particular ship operational situation.

Figure 20:
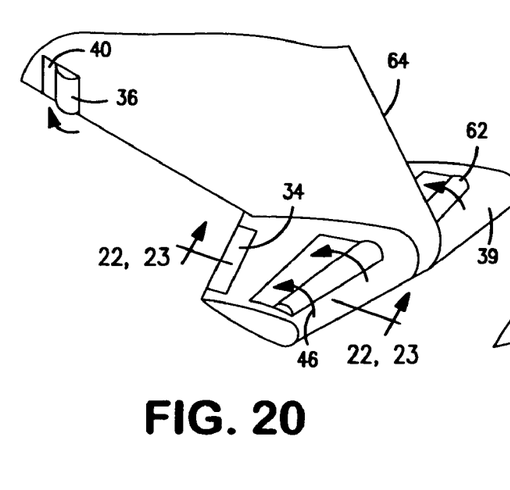
FIG. 20 presents a partial isometric view, as taken from a forward quarter bow view upper location, that shows another Coanda effect water energizing means that aids in taking water into a water propulsor. In this instance the water is taken in over an upper surface of the secondary bow.

FIG. 20 presents a partial isometric view, as taken from a forward quarter bow view upper location, that shows another Coanda effect water energizer 62 that aids in taking water into a water propulsor. In this instance the water is taken in over an upper surface of the secondary bow 39.

Figure 21:
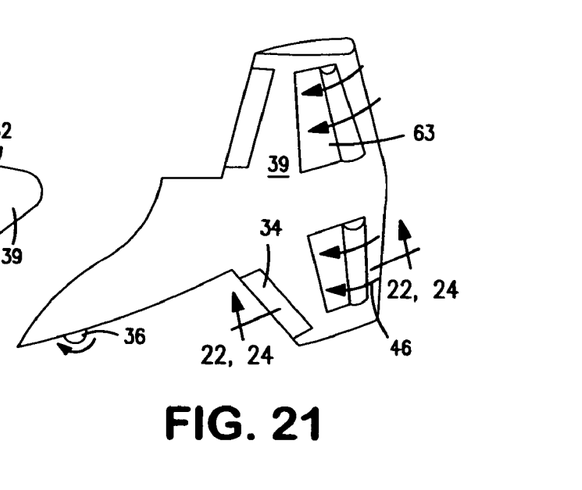
FIG. 21 shows a partial isometric view, as taken from a aft quarter bow view lower location, that shows another Coanda effect water energizing means that aids in taking water into a water propulsor. In this instance the water is taken in over a lower surface of the secondary bow.

FIG. 21 shows a partial isometric view of the secondary bow 39, as taken from a lower location, that shows another Coanda effect water energizing means 63 that aids in taking water into a water propulsor. In this instance the water is taken in over a lower surface of the secondary bow 39.

Figure 22:
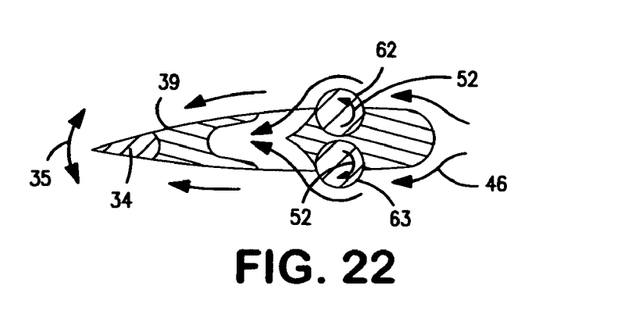
FIG. 22 presents a cross-section, as taken though plane 22-22 of FIGS. 20 and 21, that shows workings of Coanda effect water energizers disposed both on the upper and lower surfaces of the secondary bow.

FIG. 22 presents a cross-section, as taken though plane 22-22 of FIGS. 20 and 21, that shows workings of Coanda effect water energizers 62, 63 disposed both on the upper and lower surfaces of the secondary bow 39.

Figure 23:
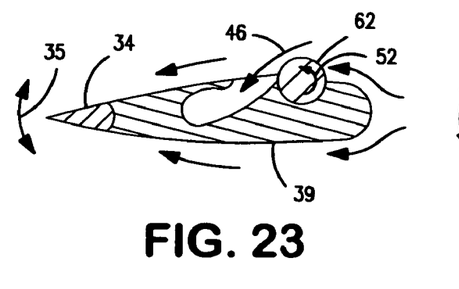
FIG. 23 is a cross-section, as taken through plane 23-23 of FIG. 20, that shows a Coanda effect water energizer disposed on the upper surface of the secondary bow.

FIG. 23 is a cross-section, taken through plane 23-23 of FIG. 20, that shows a Coanda effect water energizer 62 disposed on the upper surface of the secondary bow 39.

Figure 24:
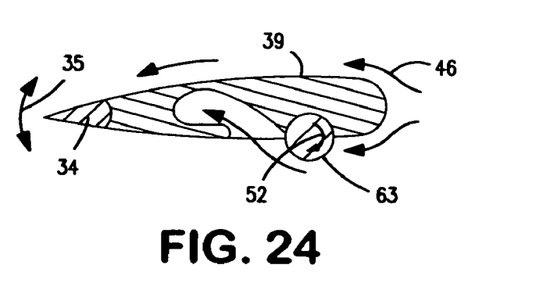
FIG. 24 is a cross-section, as taken through plane 24-24 of FIG. 21, that shows a Coanda effect water energizer disposed on the lower surface of the secondary bow

FIG. 24 is a cross-section, taken through plane 24-24 of FIG. 21, that shows a Coanda effect water energizer 63 disposed on the lower surface of the secondary bow 39.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sole definition of the invention.

What I claim is:

1. In an improved means for integrating a water propulsion system into a ship, the improvement comprising:
   a secondary at least in its majority hammerhead shaped bow disposed, at least in its majority, proximal a lower forward portion of a main bow of the ship, a bow oriented water propulsor having a first bow oriented ram water inlet disposed proximal a forward portion of the secondary at least in its majority hammerhead shaped bow of the main hull of the ship and said bow oriented ram water inlet, at least in its majority, defining an opening in a forward portion of the secondary at least in its majority hammerhead shaped bow of the ship to take in water directly approaching the secondary at least in its majority hammerhead shaped bow of the ship and wherein, when the ship is moving forward and the first bow oriented water propulsor is operating, water taken into the first bow oriented ram water inlet generates a hydrodynamic force on a bow wave of said ship thereby reducing energy of said bow wave.

2. The improved means for integrating a water propulsion system into a ship of claim 1 wherein said bow oriented water propulsor expels at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

3. The improved means for integrating a water propulsion system into a ship of claim 2 wherein the first bow oriented water propulsor further comprises a steering means wherein said steering means is, at least in its majority and with the ship moving forward and with the first bow oriented water propulsor producing forward thrust, disposed internal to the first open bottomed pressurized gas layer.

4. The improved means for integrating a water propulsion system into a ship of claim 1 which further comprises outrigger hulls disposed either side of the main hull of the ship.

5. The improved means for integrating a water propulsion system into a ship of claim 1 wherein said secondary at least in its majority hammerhead shaped bow has a greater horizontal dimension than vertical dimension.

6. The improved means for integrating a water propulsion system into a ship of claim 1 which further comprises a propulsor water inlet disposed aft of the secondary at least in its majority hammerhead shaped bow and in a side of the main hull of the ship wherein said water inlet is supplied with water energized by a Coanda effect fluid energizing device disposed proximal the propulsor water inlet.

7. The improved means for integrating a water propulsion system into a ship of claim 1 which further comprises a propulsor water inlet disposed in the side of, forward of, and proximal an aft portion of the main hull of the ship wherein said water inlet is supplied with water energized by a rotatable through 360 degrees Coanda effect fluid energizing device disposed proximal the propulsor water inlet.

8. In an improved means for integrating a water propulsion system into a ship, the improvement comprising:
a secondary at least in its majority hammerhead shaped bow disposed, at least in its majority, proximal a lower forward portion of a main bow of the ship and including a secondary at least in its majority hammerhead shaped bow upper surface propulsor water inlet and wherein said secondary at least in its majority hammerhead shaped bow upper surface propulsor water inlet takes in water flowing over the secondary at least in its majority hammerhead shaped bow of the ship and supplies said water to a water propulsor and wherein, when the ship is moving forward and the water propulsor is operating and producing forward thrust, water taken into the secondary at least in its majority hammerhead shaped bow upper surface propulsor water inlet generates a hydrodynamic force on a bow wave of said ship thereby reducing energy of said bow wave.

9. The improved means for integrating a water propulsion system into a ship of claim 8 wherein the secondary at least in its majority hammerhead shaped bow of the ship has a shape that is wider in horizontal than vertical dimension.

10. The improved means of integrating a water propulsion system into a ship of claim 8 wherein said bow oriented water propulsor expels at least a majority of its discharge propulsive force water aft into an open bottomed recess inset upward into the main hull of the ship and wherein an open bottomed pressurized gas layer is formed into said open bottomed recess and wherein said open bottomed pressurized gas layer is supplied with gas from artificial gas pressurization means.

11. The improved means for integrating a water propulsion system into a ship of claim 8 which further comprises a secondary at least in its majority hammerhead shaped bow lower surface propulsor water inlet and wherein said secondary bow lower surface propulsor water inlet takes in water flowing under the secondary at least in its majority hammerhead shaped bow of the ship and supplies such water to a water propulsor and wherein, when the ship is moving forward and the water propulsor is operating and producing forward thrust, water taken into the secondary at least in its majority hammerhead shaped bow lower surface propulsor water inlet generates a hydrodynamic force on a bow wave of said ship thereby reducing energy of said bow wave.

12. The improved means for integrating a water propulsion system into a ship of claim 8 wherein an inlet fluid flow controlling flap is disposed internal to the secondary at least in its majority hammerhead shaped bow upper surface propulsor water inlet.

13. The improved means for integrating a water propulsion system into a ship of claim 11 wherein an inlet fluid flow controlling flap is disposed internal to the secondary at least in its majority hammerhead shaped bow lower surface propulsor water inlet.

14. In an improved means for integrating a water propulsion system into a ship, the improvement comprising:
a secondary bow disposed, at least in its majority, proximal a lower portion of a main bow of the ship and including a Coanda effect fluid energizer disposed proximal a forward portion of said secondary bow wherein said Coanda effect fluid energizer energizes water supplied to a propulsor water inlet and wherein said water inlet supplies water to a water propulsor and wherein, when the ship is moving forward and the water propulsor is operating and generating forward thrust, water taken into the propulsor water inlet generates a hydrodynamic force on a bow wave of said ship thereby reducing energy of said bow wave and wherein said bow oriented water propulsor expels at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

15. The improved means for integrating a water propulsion system into a ship of claim 14 which further comprises a propulsor water inlet disposed aft of the secondary bow and proximal a forward knuckle in a side of the main hull of the ship and a Coanda effect fluid energizing device disposed proximal said propulsor water inlet.

16. The improved means for integrating a water propulsion system into a ship of claim 14 which further comprises a propulsor water inlet disposed in the side of, forward of, and proximal a portion of the main hull of the ship wherein said water inlet is supplied with water energized by a Coanda effect fluid energizing device disposed proximal the propulsor water inlet.

17. In an improved means for integrating a water propulsion system into a ship, the improvement comprising:
a secondary bow disposed, at least in its majority, proximal a lower forward portion of a main bow of the ship and including a secondary bow upper surface propulsor water inlet and a Coanda effect fluid energizing means disposed forward of said secondary bow upper surface propulsor water inlet to thereby energize water taken into the secondary bow upper surface propulsor water inlet and wherein said secondary bow upper surface propulsor water inlet takes in water flowing over the secondary bow of the ship and supplies such water to a water propulsor and wherein, when the ship is moving forward and the water propulsor is operating and producing forward thrust, water taken into the secondary bow upper surface propulsor water inlet generates a hydrodynamic force on a bow wave of said ship thereby reducing energy of said bow wave.

18. The improved means for integrating a water propulsion system into a ship of claim 17 which further comprises a secondary bow lower surface propulsor water inlet and a Coanda effect fluid energizing device disposed forward of said secondary bow lower surface propulsor water inlet to thereby energize water taken into the lower surface propulsor water inlet and wherein said secondary bow lower surface propulsor water inlet takes in water flowing under the secondary bow of the ship and supplies such water to a water propulsor and wherein, when the ship is moving forward and the water propulsor is operating and producing forward thrust, water taken into the secondary bow lower surface propulsor water inlet generates a hydrodynamic force on a bow wave of said ship thereby reducing energy of said bow wave.

19. In an improved means for integrating a water propulsion system into a ship, the improvement comprising:

a first propulsor water inlet disposed in a side of the main hull of the ship proximal a forward knuckle in the side of the main hull of the ship and a Coanda effect fluid energizing device disposed proximal said first propulsor water inlet, and a second propulsor water inlet disposed in the side of the main hull of the ship and forward of an aft portion of the main hull of the ship and a Coanda effect fluid energizing device disposed proximal said second propulsor water inlet and wherein said water inlets are supplied with water energized by the Coanda effect fluid energizing means and which further comprises a secondary bow disposed, at least in its majority, proximal a lower forward portion of a main bow of the ship and a Coanda effect fluid energizing device disposed proximal a forward portion of said secondary bow wherein said Coanda effect fluid energizing device energizes water supplied to a bow propulsor water inlet and wherein said bow propulsor water inlet supplies water to a bow water propulsor and wherein, when the ship is moving forward and the bow water propulsor is operating and generating forward thrust, water taken into the bow propulsor water inlet generates a hydrodynamic force on a bow wave of said ship thereby reducing energy of said bow wave.

20. The improved means for integrating a water propulsion system into a ship of claim 19 wherein said bow oriented water propulsor expels at least a majority of its discharge propulsive force water aft into an open bottomed recess inset upward into the main hull of the ship and wherein an open bottomed pressurized gas layer is formed in said open bottomed recess and wherein said open bottomed pressurized gas layer is supplied with gas from artificial gas pressurization means.

* * * * *